July 31, 1928.

F. SCHNEIDER ET AL 1,679,175

CHUCK

Filed Aug. 26, 1926

Inventors

Franklin Schneider & Edwin L. Connell

By Brockett & Hyde.

Attorneys

Patented July 31, 1928.

1,679,175

UNITED STATES PATENT OFFICE.

FRANKLIN SCHNEIDER AND EDWIN L. CONNELL, OF CLEVELAND, OHIO, ASSIGNORS TO THE VAN DORN ELECTRIC TOOL COMPANY, OF CLEVELAND, OHIO, A CORPORATION OF OHIO.

CHUCK.

Application filed August 26, 1926. Serial No. 131,692.

This invention relates to chucks such as are commonly employed upon the working spindles of drill presses, electric drills and similar power driven tools for the purpose of readily securing and releasing the bits such as twist drills or screw driver blades used upon the work.

The present invention relates especially to quick locking and releasing chucks for screw driver blades for use in connection with portable electric screw drivers. The objects of the invention are to produce a chuck which shall be simple, inexpensive and "fool proof" and above all one which shall not release or tend to release accidentally.

Figure 1:
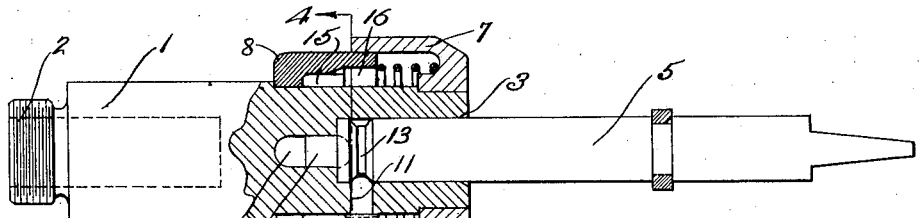
Figure 2:
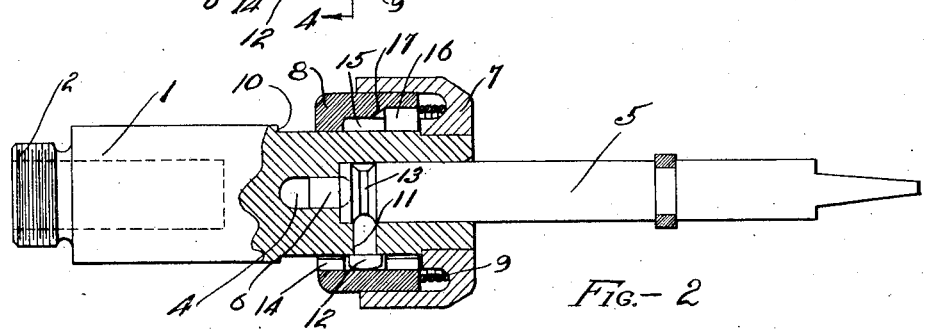
Figure 3:
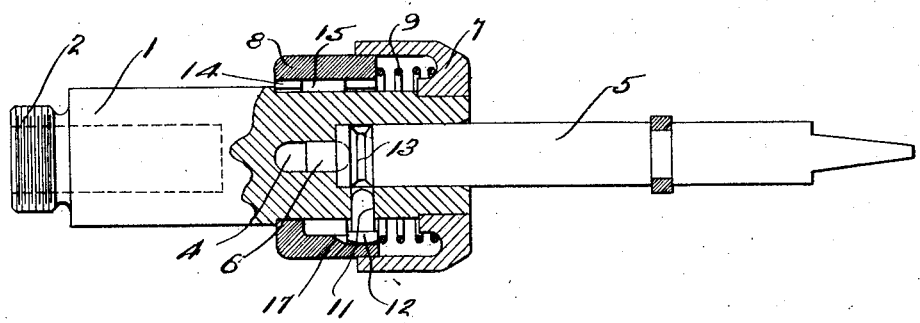
Figure 5:
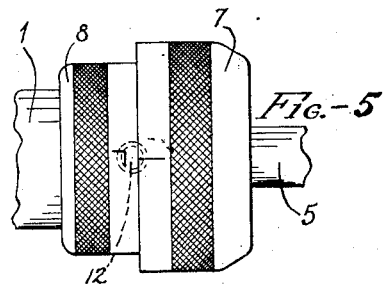
Figure 4:
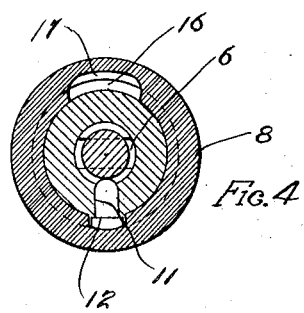

The exact nature of the invention together with further advantages will be apparent from the following description taken in connection with the drawings in which Figs. 1, 2 and 3 are sectional views showing the construction of the chuck, together with the arrangement of the parts thereof, with a screw driver blade in position in the chuck; the parts of which are in secured, intermediate and release positions respectively; Fig. 4 is a sectional view along the line 4—4 of Fig. 1; and Fig. 5 is a partial side view of the parts appearing in section in Figs. 1 to 3.

The principal or base part of the chuck is a spindle 1 provided with screw threads 2, or other means upon one end whereby the spindle may be secured with a driving member; and having at the opposite end an axial bore terminating with bit securing conformation such as a diametric slot 4; the bore being of size to fit the shank of a bit such as a screw driver blade 5 which terminates with a projecting diametric portion 6 to fit the slot 4.

Upon the bit end of the spindle is secured as by shrinking thereon, a retainer sleeve 7; and movable upon the spindle and partially within the retainer sleeve 7 is a bit release sleeve 8. A helical spring 9 is positioned within an annular groove in the retainer sleeve, and operative between the groove and the face of the sleeve 8 whereby the bit release sleeve is normally maintained in contact with a shoulder 10 upon the spindle. The sleeves are preferably knurled as indicated in Fig. 5.

Leading to the axial bore of the spindle is a radial bore 11 in which is positioned a headed button 12, the size and conformation of the button being such that the head of the button allows the toe to project somewhat into the axial bore of the spindle to engage an annular groove 13 of a bit positioned therein. The bit release sleeve is provided with a longitudinal groove 14 adapted to clear the head of the button, and intersecting the same an annular groove 15 of the same depth. Circumferentially spaced from the longituidnal groove 14, preferably diametrically, is an arcuate groove 16 of depth greater than that of the grooves 14 and 15 and sufficient to allow radial movement of the button when aligned therewith to clear the bore 3 and thus release the bit. A short cam surface 17 is provided between the grooves 16 and 15.

From the foregoing description it will be evident that with the parts in the position indicated in Fig. 1, the bit is positively secured in the chuck, the toe of the button projecting into the annular groove of the bit to prevent its removal from the chuck, the button being positively positioned by the longitudinal groove 14 clearing the head but preventing withdrawal of the button from the bit, as well as rotational movement of the bit release sleeve 8; and the spring 9 maintaining the bit release sleeve longitudinally in this position.

Operation of the chuck, beginning with the parts as indicated in Fig. 1, will be seen to be as follows:

To release the bit the bit release sleeve is first moved longitudinally against the spring until the head of the button is aligned with the annular groove 15 (Fig. 2); whereupon the bit release sleeve may be rotated until the button is in longitudinal alignment with the arcuate groove 16. Thereupon the spring will effect longitudinal movement of the bit release sleeve to bring the arcuate groove 16 into alignment with the button; whereupon the button is free to move outwards to clear the bit (Fig. 3) which may then be removed, the parts of the chuck being retained in this position by the spring.

Upon replacing the bit it may be secured by manipulation of the bit release sleeve in the opposite sequence of that described for releasing the bit. With the parts in the position indicated in Fig. 3 the bit release sleeve is first moved longitudinally against the spring. This movement by the action of the cam 17 against the head of the button, moves the button inwardly to engage the annular groove of the bit. The bit release sleeve is next rotated until the button is longitudinally aligned with the groove 14, whereupon release of the sleeve allows the spring to effect movement thereof to again positively lock the button as indicated in Fig. 1.

It is seen that three distinct motions of the bit release sleeve, the first motion directly against the spring 9 and the second motion impeded by the friction of the parts affected by the spring, are acquired to release the bit from the chuck. It will be evident therefore that accidental release of the bit no matter to what vibration or external force it may be subjected will be practically an impossibility. It is clear moreover that release of the bit when desired may be readily effected. It will be noted also that the design of our chuck is such that all of the parts thereof may be readily manufactured; and that the chuck is of adequate strength, the sleeve 7 serving to strengthen the mouth of the chuck, as well as for the function described.

What we claim is:

1. In a chuck, a spindle having an axial bit receiving bore, means for preventing rotation of a bit in said bore, said spindle being also provided with an abutment and a shoulder spaced therefrom, a sleeve movable upon said spindle between said abutment and said shoulder, a spring operative between said sleeve and said abutment to normally maintain said sleeve against said shoulder, said spindle being also provided with a radial opening, a headed bit retaining member arranged in said opening and adapted to project into said axial bore for engagement with a bit therein, said sleeve being provided with a longitudinal groove adapted to clear the head of said bit retaining member but to maintain said member projecting into said bore, said sleeve being also provided with an annular groove intersecting said longitudinal groove and adapted to allow relative rotation of said sleeve and said spindle subject to prior longitudinal movement of said sleeve against said spring, said sleeve being also provided with an arcuate groove circumferentially spaced from said longitudinal groove and communicating with said annular groove, said arcuate groove being of sufficient depth to allow said bit retaining member, when aligned therewith, to clear said axial bore.

2. In a chuck, a spindle having an axial bit receiving bore, means for preventing rotation of a bit in said bore, said spindle being also provided with an abutment and a shoulder spaced therefrom, a sleeve movable upon said spindle between said abutment and said shoulder, a spring operative between said sleeve and said abutment to normally maintain said sleeve against said shoulder, said spindle being also provided with a radial opening, a headed bit retaining member arranged in said opening and adapted to project into said axial bore for engagement with a bit therein, said sleeve being provided with a longitudinal groove adapted to clear the head of said bit retaining member but to maintain said member projecting into said bore, said sleeve being also provided with an annular groove intersecting said longitudinal groove and adapted to allow relative rotation of said sleeve and said spindle subject to prior longitudinal movement of said sleeve against said spring, said sleeve being also provided with an arcuate groove circumferentially spaced from said longitudinal groove and communicating with said annular groove by a cam surface, said arcuate groove being of sufficient depth to allow said bit retaining member, when aligned therewith, to clear said axial bore.

3. In a chuck, a spindle having an axial bit receiving bore, means for preventing rotation of a bit in said bore, said spindle being also provided with an abutment and a shoulder spaced therefrom, a sleeve movable upon said spindle between said abutment and said shoulder, a spring operative between said sleeve and said abutment to normally maintain said sleeve against said shoulder, said spindle being also provided with a radial opening, a headed bit retaining member arranged in said opening and adapted to project into said axial bore for engagement with a bit therein, said sleeve being provided with a longitudinal groove adapted to clear the head of said bit retaining member but to maintain said member projecting into said bore, said sleeve being also provided with an annular groove intersecting said longitudinal groove and adapted to allow relative rotation of said sleeve and said spindle subject to prior longitudinal movement of said sleeve against said spring, said sleeve being also provided with groove means circumferentially spaced from said longitudinal groove and communicating with said annular groove, said groove means being of sufficient depth to allow said bit retaining member, when aligned therewith, to clear said axial bore.

4. In a chuck, a spindle having an axial bit receiving bore, means for preventing rotation of a bit in said bore, said spindle being provided with a flanged cap member and a shoulder spaced therefrom, a sleeve movable upon said spindle between said cap member and said shoulder, a spring operative between said sleeve and said cap member to normally maintain said sleeve against said shoulder, said spring being arranged within the flange of said cap member, said spindle being also provided with a radial opening, a headed bit retaining member arranged in said opening and adapted to project into said axial bore for engagement with a bit therein, said sleeve being provided with a longitudinal groove adapted to clear the head of said bit retaining member but to maintain said member projecting into said bore, said sleeve being also provided with an annular groove intersecting said longitudinal groove and adapted to allow relative rotation of said sleeve and said spindle subject to prior longitudinal movement of said sleeve against said spring, said sleeve being also provided with an arcuate groove circumferentially spaced from said longitudinal groove and communicating with said annular groove, said arcuate groove being of sufficient depth to allow said bit retaining member, when aligned therewith, to clear said axial bore.

In testimony whereof we hereby affix our signatures.

FRANKLIN SCHNEIDER.
EDWIN L. CONNELL.